United States Patent [19]

Jehle

[11] Patent Number: 4,977,323

[45] Date of Patent: Dec. 11, 1990

[54] 360 DEGREE INFRARED SURVEILLANCE WITH PANORAMIC DISPLAY

[75] Inventor: Robert E. Jehle, Silver Spring, Md.

[73] Assignee: The United States of America as represented by the Secretary of the Navy, Washington, D.C.

[21] Appl. No.: 390,442

[22] Filed: Aug. 16, 1973

[51] Int. Cl.⁵ .................... H01L 25/00; G02B 26/10; G02B 23/02; G03B 37/00
[52] U.S. Cl. .................... 250/332; 250/334; 350/538; 350/539; 350/540; 352/69; 358/108; 358/113
[58] Field of Search ............... 250/330, 331, 332, 333, 250/334, 338, 339, 553, 578, 213 R, 213 A; 350/21, 22, 23, 538, 539, 540; 178/6.8, DIG. 8; 352/69; 358/108, 113

[56] References Cited

U.S. PATENT DOCUMENTS

| | | | |
|---|---|---|---|
| 2,158,405 | 5/1939 | Coanda | 250/213 R |
| 3,200,250 | 8/1965 | Bouwers | 250/213 R |
| 3,479,517 | 11/1969 | Bray et al. | 250/213 A |
| 3,514,186 | 5/1970 | Poncelet | 350/21 |
| 3,715,497 | 2/1973 | Cooper et al. | 178/7.6 |
| 3,728,545 | 4/1973 | Abel | 250/334 |
| 3,781,559 | 12/1973 | Cooper et al. | 250/334 |
| 3,786,269 | 1/1974 | Cooper | 250/334 |

Primary Examiner—Stephen C. Buczinski
Attorney, Agent, or Firm—Kenneth E. Walden

[57] ABSTRACT

A 360 degree infrared surveillance system comprising a scanning head rotated on a turntable having optics and IR detectors in a vertical linear array, amplifiers for each detector and light emitting diodes for each respective detector/amplifier channel. The light from the LED's is imaged onto photodetectors whose output is amplified and fed to a corresponding LED. An optical rotator causes the image of their light to rotate. A lens images this light onto photodetectors located on the projector turntable, rotating synchronously with the scanner head. The photodetector current is amplified and fed to a linear array of LED's and imaged onto a cylindrical screen for display.

7 Claims, 2 Drawing Sheets

PANORAMIC SCREEN

360 DEGREE INFRARED SURVEILLANCE WITH PANORAMIC DISPLAY

BACKGROUND OF THE DISCLOSURE

The present invention relates generally to infrared scanning systems and more specifically to panoramic surveillance systems for detecting heat producing bodies.

Surveillance systems have been of prime importance to the Navy in both detecting and recognizing enemy and friendly ships and aircraft. Numerous methods and devices have been developed to accomplish these ends. For example, complex monopulse radar systems have been developed that operate at x-band frequencies which can distinguish minute detail of targets at great distances. However, these systems often require expensive computer processing equipment to process the high frequency signals for display. In addition, the monopulse hardware is extremely complex and expensive.

Infrared scanning systems have also been used to detect potential targets. Basically two types of systems have been known to the prior art. One type uses a linear array of detectors located along the elevation axis which are electronically scannd for data as they are mechanically rotated in the azimuthal plane. This electronically scanned data is then fed to a television monitor at a remote location for viewing in real time. The great advantage of the infrared scanners over radar apparatus giving similar results is that they are relatively inexpensive in comparison, while still giving detailed target information in nonvisible conditions, e.g., night, haze, etc., at moderate distances. The other type of scanning system uses a linear array of detectors connected to light emitting diodes (LED's) which are subsequently scanned by a television camera which transmits the picture to a television monitor at a remote location. These systems however show only a narrow sector of the azimuthal plane at any given instant of time. It is desirable to display the entire 360° azimuthal plane at once so that the viewer can search a much larger volume of space. To display the entire azimuthal plane simultaneously, a system with a much larger signal bandwidth is necessary to be compatible with the flicker fusion rate of the human eye. The bandwidth of the prior art infrared systems would allow scanning rates of only about one per second where the flicker fusion rate requires at least 30 scans per second. Although it is possible to trick the eye through different techniques, i.e., flashing a non-refreshed frame twice before presenting a second frame, placing large amounts of memory into the display, etc., the possibility of rotating the scanner head at large angular rates has been explored instead.

One of the problem areas in driving a system at large angular rates is how to pick off the signals from each detector in the array. Normally, a mechanically rotating system uses slip rings to accomplish this objective. However, the use of a large number of slip rings, one for each channel, in a rapidly rotating system would introduce noise and mechanical problems that are best avoided.

Additionally, the use of slip rings resigns the designer to rotating not only the optics but all the electronic preamp circuits and the detector/cooler assembly at these high rates. It was decided therefore to seek another solution.

Another problem arising out of such a system is how to display, in real time, all the information gathered. A cursory examination of the bandwidth requirements will show, that the display must be capable of handling several hundred megahertz. Bandwidth considerations alone rule out the use of a conventional CRT display. A multigun CRT was considered. However, even a ten gun CRT is inadequate to handle the required bandwidth.

SUMMARY OF THE INVENTION

These limitations and disadvantages are overcome by the present invention which rapidly scans infrared radiation in a 360 degree azimuthal plane to produce a panoramic display. The invention uses a rotating scanning head comprising a linear array of detectors mounted on a rotating turntable. The detectors produce electrical signals which are amplified and transformed into visible light by a linear array of light emitting diodes. Since the LED's are mounted on the turntable, this light is rotating at the same angular velocity as the scanning head. It is then projected onto an electro-optical transmission line for transmission to a remote location. The output of the electro-optical transmission line is a rotating image which is projected onto a linear array of photodetectors mounted on a turntable at the same angular velocity as the scanning head. The detectors are connected to LED's also mounted on the turntable, which paint or sweep out a panoramic view of the scanned scene.

It is therefore the object of the present invention to provide an inexpensive and effective 360° infrared scanning device.

Another object of the invention is to provide an infrared scanning system with a large signal bandwidth.

Another object of the invention is to provide an effective and simple device for picking off the rotational signals of a high speed rotating scanner.

Another object of the invention is to provide a simple and effective device for displaying a 360° picture.

Other objects, advantages and novel features of the invention will become apparent from the following detailed description of the invention when considered in conjunction with the accompanying drawings wherein:

DETAILED DESCRIPTION OF THE PREFERRED EMBODIMENT

Figure 1:
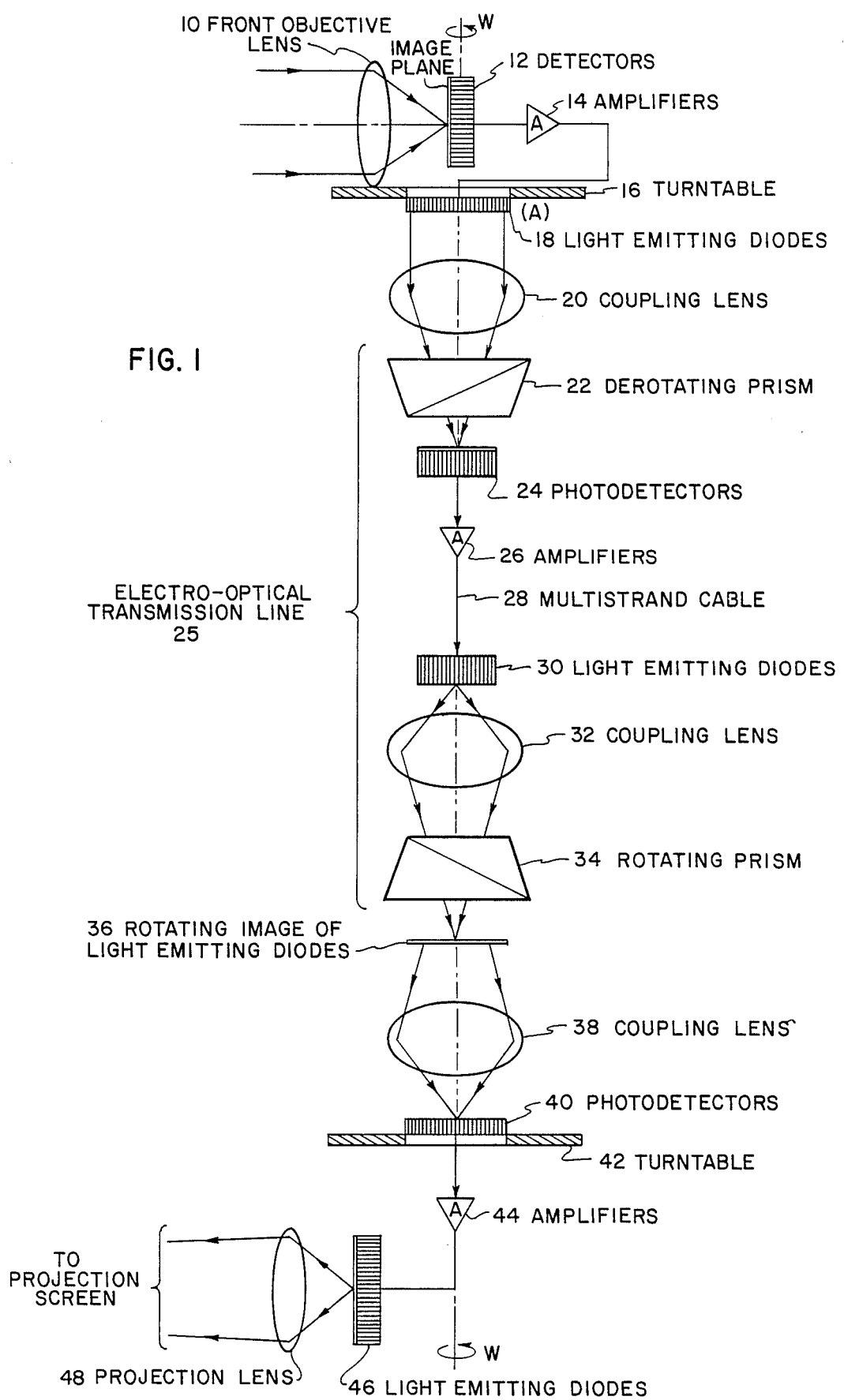
FIG. 1 is a diagram of the preferred embodiment.

FIG. 1 is a diagram of the preferred embodiment of the invention. Front objective lens 10 images the incoming IR radiation on detectors 12 which are in turn connected to amplifiers 14 and light emitting diodes 18. These elements are all mounted on turntable 16 which rotates at an angular velocity $\omega$, such that the 360° degree azimuthal plane is scanned for IR radiation. The light emitting diodes 18 produce visible light which varies proportionally with the magnitude of their input signals.

This visible light from the LED's is projected onto the electro-optical transmission line 25 for transmission to a remote location for display. The electro-optical transmission line comprises a derotating prism which produces a stationary image of the visible light from the rotating linear array of light emitting diodes 18 on photodetectors 24. The electrical signal produced by the photodetectors 24 is amplified by amplifiers 26 and transmitted to a remote location via multistrand cable 28. Light emitting diodes 30 connected to the multistrand cable produce visible light corresponding to that detected by photodetectors 24. This visible light is projected onto a rotating prism via collumating lens 32 to produce a rotating image 36 of the light emitting diodes at a remote location corresponding to that produced by light emitting diodes 18. The purpose then of the electro-optical transmission line is to electrically transmit a rotating optical image to a remote location.

The rotating image 36 is projected onto photodetectors 40 mounted on turntable 42 which is rotating in the same direction at the same angular velocity ω. The photodetectors 40 are connected to amplifiers 44 which are in turn connected to light emitting diodes 46 which project their light onto the projection screen of via projector lens 48.

Figure 2:
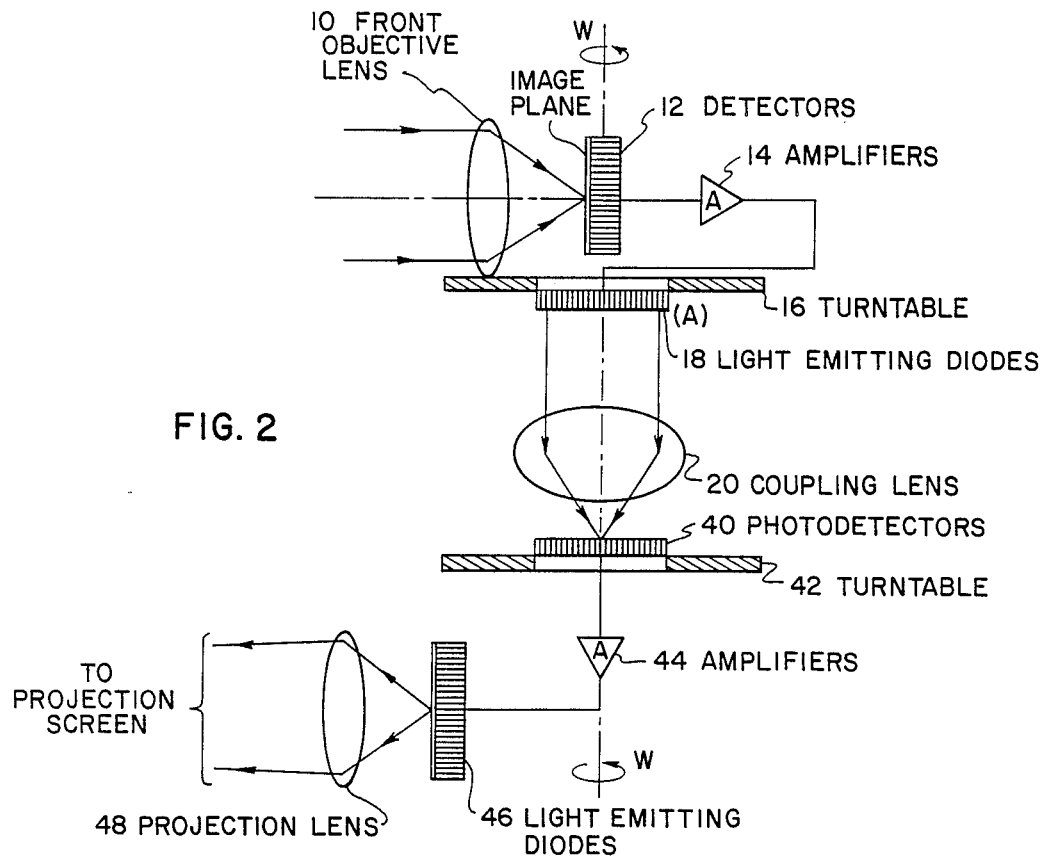
FIG. 2 is a diagram of the preferred embodiment without the electro-optical transmission line.

When the projection screen of FIG. 3 can be located directly above or below the scanning device, the apparatus of FIG. 2 can be used which constitutes the device of FIG. 1 without the electro-optical transmission line 25. The only purpose of the electro-optical transmission line of FIG. 1 is to transmit the scanned data to a remote location. Since the display screen is located directly above or below the scanner in FIG. 2, use of these extra elements can be avoided. Operation of the device of FIG. 2 is the same as the device of FIG. 1 without the electro-optical transmission line 25 since its input and output are the same.

Figure 3:
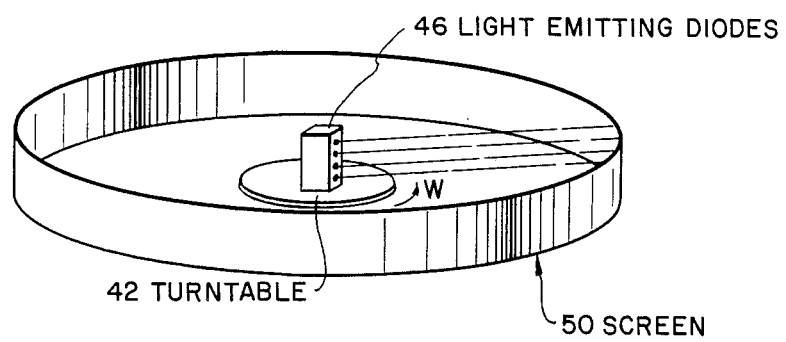
FIG. 3 is a diagram of the panoramic screen used with the preferred embodiment.

FIG. 3 shows the panoramic screen used for display. The screen can be viewed from either above or below. Turntable 42 is rotated at an angular velocity such that the light from LED's 46 is projected onto the screen at a rate greater than the flicker fusion rate of the eye. The 360 degree panoramic view thus appears stationary so that the observer may randomly scan it to pick out information in a rapid manner.

Obviously many modifications and variations of the present invention are possible in light of the above teachings. It is therefore to be understood that within the scope of the appended claims the invention may be practiced otherwise than as specifically described.

I claim:

1. A surveillance system for detecting and displaying infrared producing bodies comprising:
   a linear array of infrared detectors mounted along a vertical plane;
   first means for rotating said detectors about an axis at a predetermined angular velocity faster than the flicker fusion rate of the human eye to cause said detectors to scan the horizon in a 360 degree azimuthal plane for infrared radiation;
   light emitting diodes connected to said detectors and mounted on said means for rotating for projecting an image of said horizon rotating at said predetermined angular velocity;
   an array of photodetectors mounted on a second means for rotating to rotate said array of photodetectors at said predetermined angular velocity to detect said image of said horizon from said light emitting diodes;
   additional light emitting diodes connected to said photodetectors and mounted on said second means for rotating for producing a panoramic visual display of said entire 360° azimuthal plane simultaneously.

2. A surveillance system for detecting and displaying infrared producing bodies comprising:
   a linear array of infrared detectors mounted along a vertical plane;
   first means for rotating said infrared detectors about an axis such that said infrared detectors can scan a 360 degree azimuthal plane for infrared radiation;
   first light emitting means connected to said infrared detectors and mounted on said first means for rotating;
   electro-optical transmission means for detecting and transmitting light produced by said light emitting diodes to a remote location;
   an array of photodetectors disposed to detect said transmitted light;
   second light emitting means connected to said photodetectors;
   second means for rotating said second light emitting means to produce a panoramic visual display of said entire 360° azimuthal plane simultaneously.

3. The device of claim 1 wherein said first means for rotating comprises a turntable.

4. The device of claim 1 wherein said second means for rotating constitutes a turntable.

5. The device of claim 3 wherein said second means for rotating constitutes a turntable.

6. The system of claim 2 wherein both said first and second means for rotating comprise turntables.

7. The system of claim 2 wherein said electro-optical transmission means comprises:
   means for derotating light emitted from said light emitting means;
   photodetector means for converting said derotated light into electrical signals;
   means for producing light from said electrical signals;
   third means for rotating said produced light.

* * * * *